United States Patent
Vancraeynest

(10) Patent No.: US 6,788,665 B1
(45) Date of Patent: Sep. 7, 2004

(54) METHOD AND APPARATUS USING ALTERNATE FRAMES FOR HANDOVER IN TDMA MOBILE COMMUNICATIONS SYSTEM

(75) Inventor: Jan Vancraeynest, White Plains, NY (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/413,045

(22) Filed: Oct. 6, 1999

(51) Int. Cl.[7] .......................... H04B 7/212; H04J 3/00
(52) U.S. Cl. .................. 370/337; 370/330; 370/331; 370/332; 370/335; 370/342; 455/436; 455/437; 455/442; 455/422.1; 455/502
(58) Field of Search .................. 370/337, 330, 370/331, 332, 335; 455/436, 439, 442, 422, 277.2, 437

(56) References Cited

U.S. PATENT DOCUMENTS

| | | | |
|---|---|---|---|
| 5,345,467 A | * | 9/1994 | Lomp et al. .................. 375/1 |
| 5,511,067 A | * | 4/1996 | Miller ......................... 370/18 |
| 5,539,730 A | * | 7/1996 | Dent ........................... 370/29 |
| 5,822,313 A | * | 10/1998 | Malek et al. ................. 370/332 |
| 6,009,328 A | * | 12/1999 | Muszynski .................. 455/442 |
| 6,073,021 A | * | 6/2000 | Kumar et al. ............... 455/442 |
| 6,212,368 B1 | * | 4/2001 | Ramesh et al. ........... 455/277.2 |
| 6,628,630 B1 | * | 9/2003 | Nagase ....................... 370/331 |

FOREIGN PATENT DOCUMENTS

| WO | WO98/51111 | 11/1998 | ............ H04Q/7/38 |

* cited by examiner

*Primary Examiner*—Marceau Milford
(74) *Attorney, Agent, or Firm*—George W. Willman; Felix L. Fischer

(57) ABSTRACT

A mobile communication system including a plurality of base stations. The system includes a plurality of mobile telephones, each of which communicates with at least a base station from the plurality of base stations using frames. A mobile telephone may establish communication with a first base station. If resources are available in a second base station, communication is established with the second base station. The communication occurs with the first and second base stations alternately, on different frames.

68 Claims, 8 Drawing Sheets

METHOD AND APPARATUS USING ALTERNATE FRAMES FOR HANDOVER IN TDMA MOBILE COMMUNICATIONS SYSTEM

CROSS REFERENCE TO RELATED APPLICATIONS

This application is related to application Ser. No. 09/413,658 entitled Method and Apparatus for Handover in TDMA Mobile Communications System invented by Jan Vancraeynest, which is incorporated herein by reference in its entirety, filed on the same date as the present application.

BACKGROUND OF THE INVENTION

1. Field of the Invention

This invention generally relates to cellular communications systems having mobile subscribers, and more particularly, to a method of controlling handover in the communications of cell site stations with a mobile unit in a TDMA cellular telephone system.

2. Description of the Related Art

Cellular communications systems use a series of sites, known as base stations, to communicate with mobile subscribers. A mobile telephone unit typically communicates with the closest base station, or the base station having the best signal quality. A cellular network often includes a set of many base stations, each base station communicating with mobile telephones in an area known as a cell. As a mobile subscriber moves from one cell to another, eventually the mobile telephone begins to communicate with a new base station covering the new area and ends communication with the old base station covering the old area in which the mobile subscriber was located. This process of beginning communication with a new base station and ending communication with an old base station is known as handoff or handover.

Various systems and techniques have been developed to address problems in handoff. Two examples of patents addressing handoff in cellular communication are U.S. Pat. No. 5,822,313 by Malek and U.S. Pat. No. 5,323,466 by Kojima, both of which are incorporated herein by reference in their entirety. In some systems, simultaneous communication links are established between the mobile unit and the base stations. In some prior systems, the handover process involved the use of dual transceivers in a mobile unit. Such a dual transceiver adds cost, size and power consumption, and reduced reliability to the mobile unit.

SUMMARY OF THE INVENTION

One embodiment of the invention is a mobile communication system including a plurality of base stations. The system includes a plurality of mobile telephones. Each mobile telephone communicates with at least a base station from the plurality of base stations using frames. A mobile telephone may establish communication with a first base station. If resources are available in a second base station, communication is established with the second base station. The communication occurs with the first and second base stations alternately, on different frames.

In one embodiment of the invention, communication may be established with a third base station. In such an embodiment, the communication occurs with the first, second, and third base stations alternately, on different frames. Communication may also be established with a plurality of base stations, in addition to the first and second base stations. The communication then occurs with the first, second, and plurality of base stations alternately, on different frames.

According to another embodiment of the invention, frames are passed alternately from the base stations, without selecting between the alternate frames based on signal quality. Also, the same frames from a telecommunications network may be passed to the first and second base stations, and this may occur in parallel at the same time.

According to various embodiments of the invention, communication with the second base station may be established based on signal quality. For example, communication may be established with the second base station if the signal quality of communication with the first base station is below a first particular level. Communication may be dropped with a base station if signal quality of communication with the base station is below a second particular level.

System capacity may be controlled by appropriate adjustments. For example, system capacity would be controlled by adjusting the combination of (a) a particular level of signal quality of communication with the first base station below which circuitry attempts to establish communication with the second base station and (b) a particular level of signal quality of communication with a base station below which the circuitry drops communication with the base station. Such combination may be adjusted automatically based on measured utilization of system resources, according to an embodiment of the invention.

The second base station may be selected based on signal quality. According to one embodiment of the invention, circuitry selects as the second base station a base station having the best signal quality between the base station and the mobile telephone, from among base stations other than the first base stations. According to another embodiment of the invention, the mobile telephone has a list of base stations ordered based on the signal quality between the base stations and mobile telephones, and the mobile telephone includes circuitry that selects the best second base station as the first available base station on the list. The list may be ordered based on received signal strength indicator (RSSI), in one embodiment of the invention, or frame error rate (FER), in another embodiment of the invention, or a combination of both.

Another embodiment of the invention is directed to a mobile telephone. The mobile telephone includes a single radio with a single synthesizer and circuitry that monitors the signal quality with various base stations. The mobile telephone includes circuitry that, when the mobile telephone is in communication with a first base station, causes the mobile telephone to request communications with a second base station based on the measured signal quality of the respective base stations. The circuitry causes the communication to occur with the first base station and the second base station alternately, on different frames.

An embodiment of the invention is directed to a base station. The base station comprises a radio capable of communication with mobile telephones. The base station comprises circuitry that establishes communication with a mobile telephone when the mobile telephone is in communication with another base station.

The circuitry receives alternate frames from the mobile telephones, which sends the frames alternately to the base station and another base station.

An embodiment of the invention is directed to a method of seamless handover in a telecommunications system. The method includes establishing communication with a second base station when a mobile telephone has established communication with a first base station and if resources are available in the second base station. Communication is caused to occur with the first and second base stations alternately, on different frames. According to one embodiment of the invention, communication is established with the second base station only if signal quality of communication with the first base station is below a first particular level. According to another embodiment of the invention, communication with a base station is dropped if signal quality of communication with the base station is below a second particular level.

DETAILED DESCRIPTION

Figure 1A:
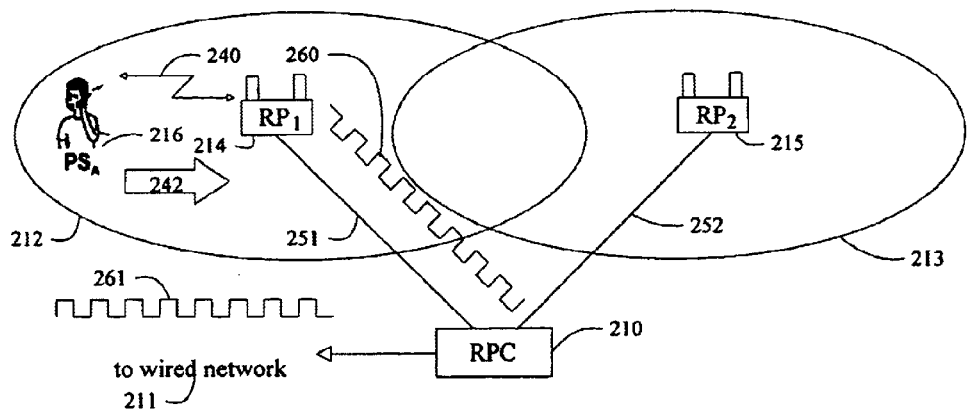
FIGS. 1A, 1B and 1C illustrate a mobile communications system illustrating different connectivity as a subscriber in a mobile communications system moves from the coverage of one base station to another, according to an embodiment of the invention.

The handover process in mobile communications presents some challenges. For example, as a mobile telephone switches from communicating with a first base station to communicating with a second base station, interruption in the communication may occur. Such interruption may be audible, in the form of a click, other noise or simply silence. Avoiding this problem by providing dual radios for allowing for simultaneous communication with multiple base stations is expensive.

There are also performance impacts from the practice of adding enough timeslots in a frame so that there will always be two non-adjacent timeslots which can be used for communications (i.e., at least seven timeslots per half frame). For example, there may be increased round-trip delay for a given timeslot length. Further, such an approach is not always practical or desirable especially if it is required to have compatibility with the existing system standards that use fewer than seven timeslots per frame. One embodiment of the invention is a system in which there are no more than six timeslots per half frame.

An embodiment of the invention helps to address some of these problems by communicating with more than one base station alternately, on different frames on different timeslots. Such an approach my help accommodate limitations of the mobile telephone equipment. For example, a mobile telephone may be limited if its radio has a slow frequency synthesizer that is capable of using the same frequency only on adjacent timeslots. Communications with different base stations within the same frame may be difficult on such a system because of such a limitation—the mobile telephone radio may not be able to tune quickly enough to an available frequency on an available timeslot in the second base station to allow the mobile telephone to use the timeslot.

An embodiment of the invention is directed to a time division multiple access (TDMA) system. In a TDMA system, multiple conversations are handled by dividing time up into a series of frames. Each frame is divided into a set of timeslots. A burst of data from each conversation may be transmitted on a timeslot of each frame. Thus, by dividing each frame into timeslots, multiple conversations can be handled on a single communications channel.

According to an embodiment of the invention, whether a mobile telephone attempts to connect to another base station or attempts to disconnect with the current base station is determined by a predetermined level of communications quality with respect to base stations. For example, according to an embodiment of the invention, a mobile telephone attempts to communicate with a second base station if signal quality of communication with the first base station is below a predetermined threshold level. If communication quality with the first base station is below a predetermined threshold level, then communication with the first base station is dropped. The threshold values of signal quality for dropping or adding a station may be different for different base stations. Also, the base stations themselves may broadcast the threshold values, and the mobile telephones will initiate or drop communication with base stations according to such broadcasted threshold values.

The threshold levels for initiating or dropping connections with base stations determine the number of mobile telephones that are communicating with more than one base station. As more mobile telephones communicate with more base stations, fewer base station resources are available. Thus, the availability of system resources may be controlled by selecting the threshold levels.

According to one embodiment of the invention, the mobile telephone maintains an ordered list of base stations according to link potential quality, potential of the wireless link between the base station and mobile telephone signal quality. Such signal quality may be measured as RSSI or FER, other metrics, or a combination thereof. When the mobile telephone determines that it should initiate communication with another base station, it selects the second base station from the list of base stations, choosing the base station having the best link quality first. If that base station is not available, another base station is selected also based on link quality. Such a process may be continued until an available base station is found. Alternatively, the mobile telephone may attempt to communicate with a base station with which it has already attempted to communicate after trying another base station or stations.

FIG. 1A shows subscriber $PS_A$ 216 beginning to move from coverage area 212 to coverage area 213. A handover process will be initiated to allow subscriber $PS_A$ 216 (personal station) to begin communicating with another base station and terminate communications with the current base station.

FIG. 1A includes radio port controller (RPC) 210, which is coupled to base station 214 and base station 215. RPC 210 is coupled to wired network 211. Thus, mobile subscribers in the coverage areas of the respective base stations are able to communicate through the base stations, and then through RPC 210, to wired network 211. Note that base stations may also be referred to as radio ports (RPs). Wired network 211 may represent the public switched telephone network (PSTN), or other communications network. Thus, mobile subscribers can communicate with a telecommunications network through the base stations and RPC 210. Subscriber PS$_A$216 is currently in coverage area 212 of base station 214. This coverage area 212 overlaps with coverage area 213 of base station 215. Base station 215 is coupled to RPC 210 via connection 251. As shown, subscriber PS$_A$216 is currently communicating with base station 214 over a wireless link 240. Base station 214 is in communication with RPC 210 via link 251. Link 251 may be comprised of a wired or wireless link. Communication 260 over link 251 is comprised of a set of timeslots. RPC 210 further communicates this information with wired network 211 via timeslot-based communication 261. Arrow 242 points in the direction of coverage area 213 from coverage area 212 and indicates that subscriber PS$_A$216 is moving toward coverage area 213 from coverage area 212.

The handoff between base station 214 and 215 occurs, according to an embodiment of the invention, in a manner that helps to allow for low cost equipment, lower weight, lower power requirements and high reliability. Such advantages are achieved through use of alternate frames for communicating with the two or more base stations.

The initiation of the handoff of subscriber PS$_A$216 between base station 214 and 215 may occur based on signal quality in the communication between the subscriber and the respective base stations. For example, the initiation of communication with the second base station may occur when signal quality with the second base station is above a certain level. The termination of communication with either the first or second base station may occur when signal quality of communication with such station is below a certain level.

Figure 1B:
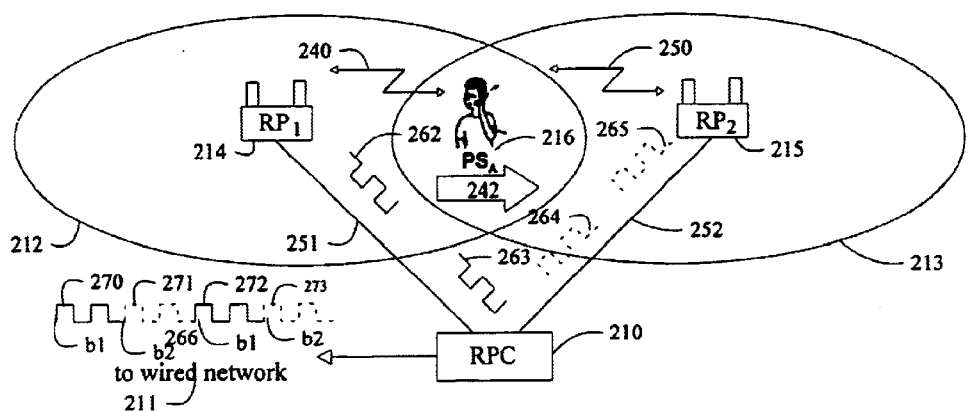

FIG. 1B shows subscriber PS$_A$216 communicating with both base stations, base station 214 and base station 215. Such configuration may have resulted from subscriber PS$_A$216's movement from the coverage area of base station 214 (area 212) to the coverage area of base station 215 (area 213). As signal quality of potential communication with base station 215 improves, according to one embodiment of the invention, subscriber PS$_A$216 requests a communications link with base station 215.

As shown in FIG. 1B, subscriber PS$_A$216 is communicating with timeslot based wireless links 240 and 250 with base stations 214 and 215 respectively. Alternate frames are used to communicate with each of the respective base stations. As shown, frames 262 and 263 are used to communicate between PS$_A$216 and base station 214, and alternate frames 265 and 264 are used to communicate between subscriber PS$_A$216 and base station 215. Thus, the RPC receives data from subscriber PS$_A$216 in a first frame on base station 214 and later receives data from subscriber PS$_A$216 on the next frame on base station 215.

The RPC interleaves both streams of frames to reconstruct the uninterrupted stream of frames which it sends to the network. According to one embodiment of the invention, the RPC does not perform any judgement on the quality of the frames received from both base stations, and the RPC does not selectively transmit only one of them for further processing. According to one aspect of the invention, the alternate frames contain different information and are routed to different base stations in stages—odd frames first, then even frames instead of routing all frames at once. According to one embodiment, in the uplink, the RPC splits incoming frames from the network and directs them alternately to the two base stations to which the subscriber is communicating, maintaining the timing correspondence to the subscriber's timing. In an alternate embodiment to the invention, as illustrated in FIG. 2 at instant (8) (position 67), each base station keeps sending both frames but the subscriber receives only the frames alternately from each base station.

The base stations use different frequencies to communicate with subscriber PS$_A$216. For example, the frequency used on wireless link 240 versus wireless link 241 may be different frequencies, according to an embodiment of the invention.

Figure 1C:
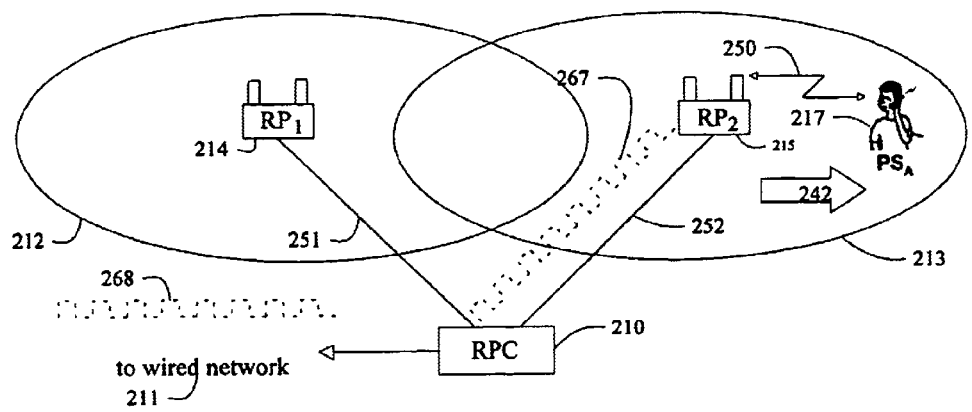

FIG. 1C shows a system according to the embodiment of the invention in which subscriber PS$_A$216 has moved out of the coverage area of base station 214 then has dropped base station 214. Thus, now subscriber PS$_A$216 is communicating via wireless link 250 with base station 215 and is no longer communicating with base station 215. Subscriber PS$_A$216 is now in communication with RPC 210 solely via link 252 with communication 267, which no longer involves alternating frames of two base stations. Thus communication 268 to wired network 211 represents frames from base station 215 rather than from both base station 215 and base station 214. Arrow 242 shows that subscriber PS$_A$216 has moved from coverage area 212 of base station 214.

Figure 2A:
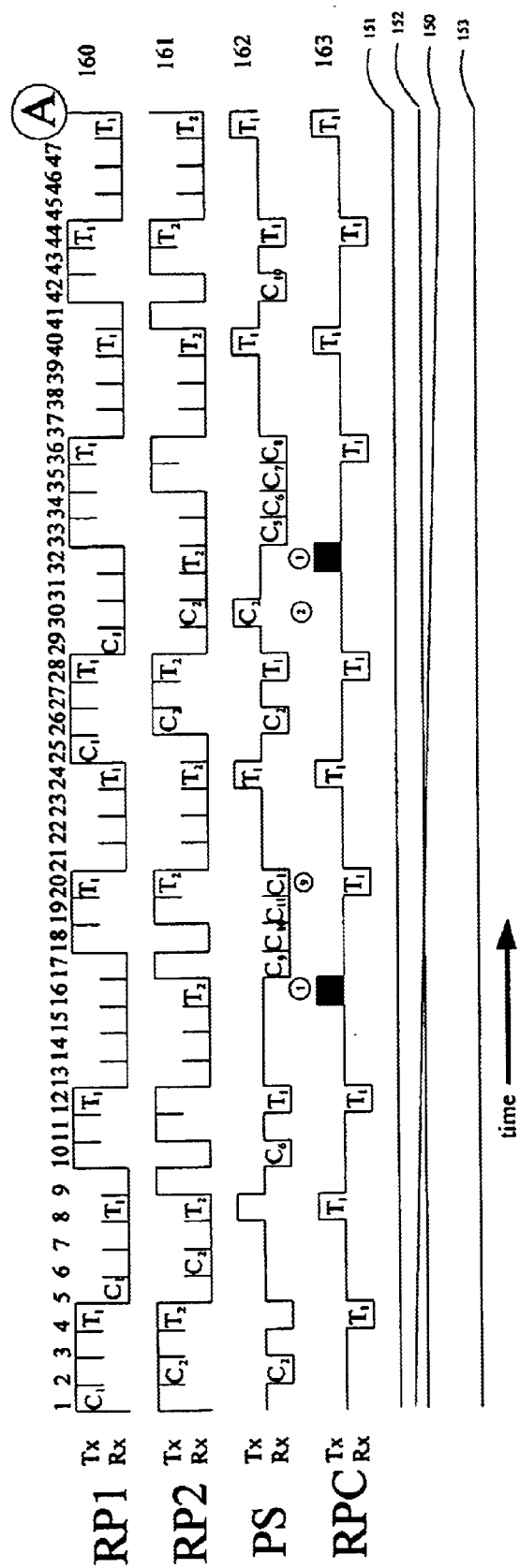
FIGS. 2A, 2B and 2C provide a sequential timing diagram illustrating communications activity between a subscriber, base stations, and base station controller, according to an embodiment of the invention.
Figure 2B:
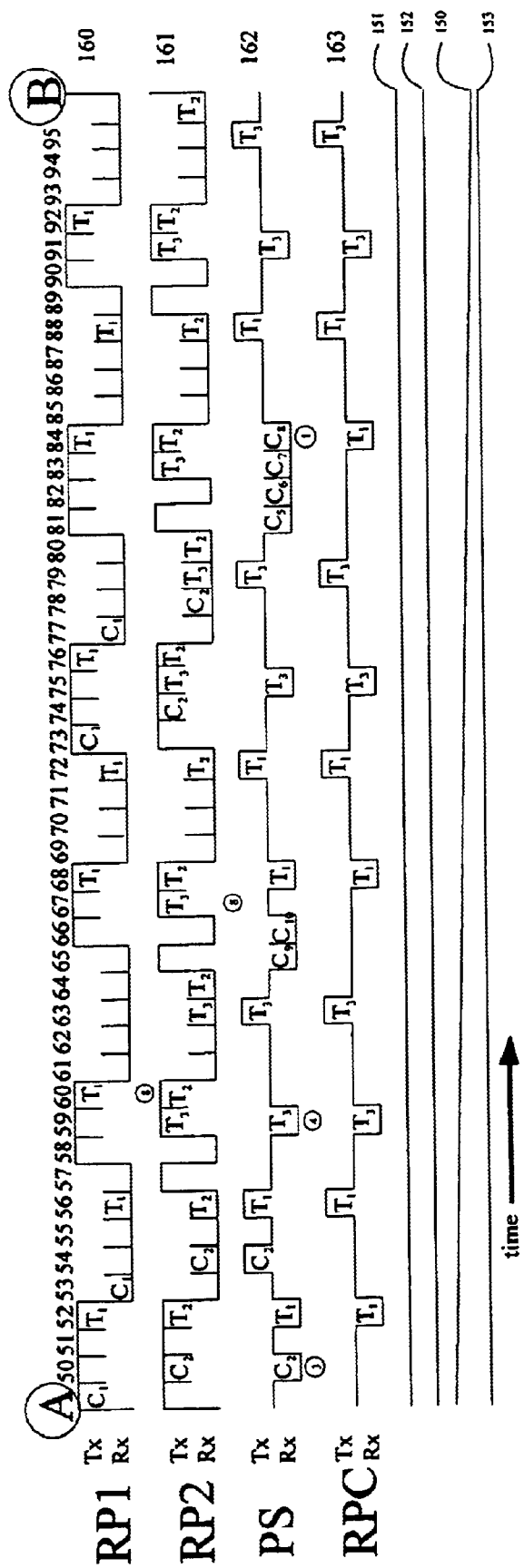
Figure 2C:
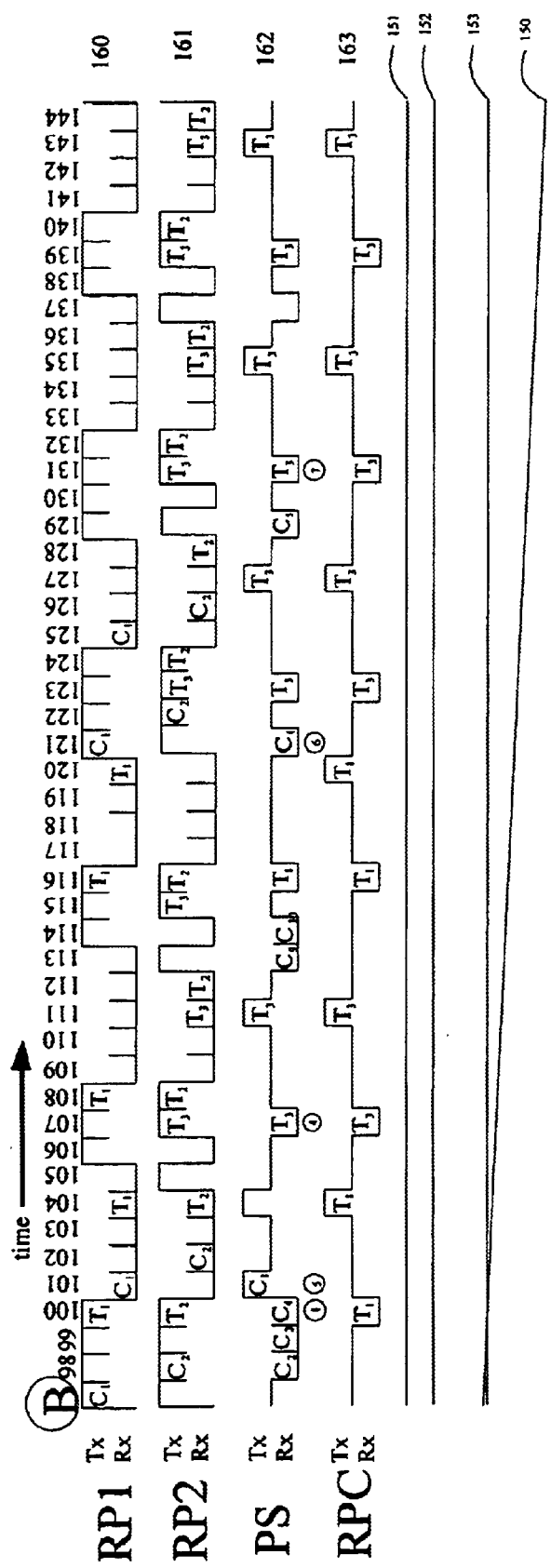

FIGS. 2A, 2B and 2C provide a sequenced timing diagram illustrating communications activity between a subscriber, base stations, and base station controller, according to an embodiment of the invention. FIGS. 2A, 2B and 2C illustrate a handover in which subscriber (communications with subscriber represented by PS trace 162) is initially communicating with a first base station (RP1 trace 160) and is handed off to a second base station (RP2 trace 161). Timeslots are numbered as positions 1–144. Communication with the radio port controller (RPC) is represented by RPC (trace 163). A radio port controller is coupled to both the first base station and second base station and communicates with a telecommunications network such as a public switched telephone network (PSTN).

In parallel to the communication with the mobile telephone equipment represented by trace PS 162, the first base station and the second base station (represented by RP1 and RP2) are communicating with other mobile telephone equipment. For example, traffic timeslot T$_2$ on timeslots 4 and 8 of trace RP2 161 (e.g., at positions 4, 8, 12, 16, etc.) represent communication with another mobile telephone equipment.

According to an embodiment in the invention, the handover is initiated based on signal quality in the link or potential link with the respected base stations. As shown here, thresholds exist for initiating a connection (connect_destination_RP_threshold 152) and for dropping communication (drop_origin_RP_threshold 153). When signal quality of communication with the first base station (trace 150) drops below the connect_destination_RP_threshold 152, the mobile subscriber equipment attempts to make a connection with another base station. When the signal quality with the initial base station drops below the drop_origin_RP_threshold 152, the mobile telephone drops communication with the original base station, or initiates the termination of communication with the initial base station.

The second base station is selected based upon potential signal quality with the second base station. According to one embodiment of the invention, such signal quality is measured by the mobile telephone measuring control signals from various base stations. The mobile telephone may maintain an ordered list of various base stations, ordered based on respective signal quality. Such lists may be updated periodically by the mobile telephone. FIG. 2A shows such measurements being taken (e.g., at positions 17–20).

The traces shown include a series of TEMA frames and each frame includes a number of timeslots. As shown here, each time frame includes eight timeslots constituting four down-link slots followed by four up-link slots. Each timeslot may use a different frequency, subject to constraints of the mobile telephone unit. In some example systems, the mobile telephone can us a different frequency only on non-adjacent timeslots, and the base station ca n use an arbitrary frequency on each timeslot. As shown here, each timeslot in the down-link corresponds to a timeslot in the up-link four timeslots latter (e.g. positions 4 and 8 of trace PS162). One of the timeslots on the down-link and one of the timeslots on the up-link are reserved for the control channel at a single frequency $F_{control}$. The control timeslot is transmitted every N time frames and different base stations transmit the control channel in different slots so that only one base station transmits the control carrier at any one time in an area in which it may cause interference to control channel transmissions from other base stations. In FIGS. 2A, 2B and 2C, a super frame of N=3 frames is shown for illustrative purposes. Those skilled in the art will appreciate that a practical system using TDMA frame structure would more likely use a supper frame of 20 frames. As shown, base station 1 shown in trace 160 transmits its control channel on timeslot number 1 (e.g., position 1) and receives it on timeslot number 5 (e.g., position 5). In the example of FIGS. 2a, 2b and 2c, 12 base stations with control channels $C_1$–$C_{12}$ are accommodated in consecutive timeslots every 3 frames. It will be appreciated that the control channel may also be implemented through means other than the separate timeslots shown in the illustrative example.

The radio port controller (RPC), to which the base stations are connected, assigns timeslots and carrier frequencies as well as providing the interface between the frames transmitted over the air and land line network. Depending on the type of interface to the land line wired network, the RPC may perform multiplexing, framing, adding error correction coding, de-framing, de-multiplexing, etc. The RPC time line trace 163 does not include such operations and merely illustrates which frames are received (RX, for the wire network to the base stations) and transmitted (TX, from the base stations to the wire network) by the RPC. The base stations connected to the RPC are synchronized (e.g. by the RPC) so that the boundaries of timeslots fall within the limits of the guard time intrinsically built into the TDMA timeslot structure.

As shown in FIG. 2A, the subscriber telephone is communicating first with a first base station, represented by RP1 (trace 160). As shown, communication is on a given timeslot, shown here, for example, as T1, e.g., at position 4, (the base station transmitting to the subscriber equipment—"downlink") and T1, e.g., at position 8, (the subscriber equipment transmitting to the base station—"uplink"). A control communication takes place, for example, on timeslot 1 and timeslot 5 (e.g., positions 1 and 5 respectively).

On the idle timeslot nonadjacent to the timeslot used for traffic, the mobile telephone equipment monitors the link quality from the other base stations. Depending on the layout of the control timeslot used by the individual base stations, the mobile telephone equipment may skip one frame of communications every N frames to monitor the 2 base stations whose downlink control slot may be adjacent to the timeslot which the mobile telephone equipment is currently using for communications. By shifting the frame in which the mobile telephone equipment skips the communications with the base station relative to the repeat period of the control channel transmissions and successive super frames, the mobile telephone equipment can monitor all the base stations in the system. This introduces loss of only one frame which is unnoticeable to the subscriber if the frame length is chosen short enough and N is chosen large enough. This is indicated by instances marked ① and ⑨, e.g., positions 15, 20, 32, 84 and 100. For example, at position 16 the mobile telephone equipment is monitoring signal quality from base stations in subsequent timeslots and thus does not communicate with traffic with the base station during that timeslot. In FIGS. 2A, 2B and 2C for brevity's sake the processor shifting and the skipping frame is shown only in the first two instances of the N frames. Moreover, if the mobile telephone equipment adheres to a fixed rule of choosing which frame it skips communications, the RPC can substitute a replica of the last valid timeslot as a substitute for the missing timeslot and further reduce the impediment to voice quality as perceived by the wired network connection. Similarly, the mobile telephone equipment can replay the last received voice segment as a substitute for the active communications timeslot during which it is monitoring other RPs.

As shown in FIG. 2A, the second base station is communicating with another mobile telephone equipment using another frequency, the same timeslot at which the mobile telephone equipment is communicating with the first base station. For example, see positions 4 and 8 of trace 161 in which the second base station is communicating with another mobile telephone equipment while the first base station, represented by trace 160, is communicating on another frequency. As shown, for example, in position 4, the telephone equipment represented by trace 162 is communicating on one frequency represented by $T_1$ with the first base station represented by trace 160 and $T_1$, while the second base station, represented by trace 161, is communicating with a second telephone equipment on a second frequency represented by $T_2$. Throughout this diagram, $T_1$ represents traffic transmission at a first frequency and $T_2$ represents traffic transmission on a second frequency to an unrelated mobile telephone (i.e., first frequency may be same as second frequency).

Eventually the signal quality of communication between the telephone equipment and the first base station may degrade such that it is below the connect threshold. As shown here, trace 150 drops below connect_destination_ RP_threshold 152. As shown here, this takes place around positions 24 and 25. As a result, the telephone equipment sends a link establishment request to the base station with the current best link quality, the destination base station in the example of FIG. 2A, this is RP2 at instant ② (position 30). The mobile telephone equipment then advises the destination base station of the telephone equipment's current timeslot and frequency on the first base station. Thus $C_2$ at position 30 represents a control message from the telephone equipment requesting a link establishment. Depending on the location of the telephone equipment's control channel relative to the communication timeslot used by the telephone equipment, this message may require an interruption of one frame in the communications with the first base station. This interruption is unnoticeable in a system with judiciously chosen N (large) and frame length (short). While unnecessary for handover to another base station connected to the same RPC (because the RPC knows which timeslot and frequencies are used by the mobile telephone equipment), according to one embodiment of the invention, the current timeslot and frequency are included in the message requesting the link establishment to allow for connection with a base station not belonging to the same radio port controller.

The second base station checks whether it has a timeslot available. If a timeslot is available, the second base station sends a link assignment directive to the mobile telephone equipment. From the next frame onward, the mobile telephone equipment communicates on alternate frames with the first base station and the second base station. For example, in FIG. 2B at position 50, $C_2$ represents a control message from the second base station sending a link assignment to the mobile telephone equipment. Subsequently the mobile telephone equipment is communicating with both base stations on alternate frames. For example, in positions 59 and 63 (on traces 161 and 162) the mobile telephone equipment is communicating on frequency three with the second base station, and in positions 68 and 72 (on traces 160 and 162) the mobile telephone equipment is communicating with the first base station on frequency one. These traffic communications are taking place over different or same frequencies in this example but are possible even in a system where the mobile telephone equipment has certain limitations in changing frequencies rapidly. The mobile telephone equipment alternately receives uplink frames from the base stations. In the downlink, the radio port controller (RPC) alternately forwards frames from the base stations onto the network.

If a timeslot is not available on the second base station, the mobile telephone equipment tries to communicate with another (third) base station. Such attempt is the initiation of a link assignment process. If link assignment is successful on the third base station, the mobile telephone equipment sends a message to cancel link establishment to the second base station so that the second base station knows that it does not need to reserve a timeslot for the first mobile telephone equipment. If the link assignment attempt on the third base station is unsuccessful, the mobile telephone equipment may revisit the second base station, or may attempt to communicate with another base station, depending on potential signal quality. Using this process the mobile telephone equipment queues its link assignment with multiple base stations.

As shown in positions 59–116 the mobile telephone equipment is communicating traffic alternately with both base stations, e.g., the second base station on the timeslot at position 57–64 and the first base station on positions 65–72. For reception the mobile telephone equipment uses timeslot 2 on the second base station (see traces 162 and 161) and timeslot 4 on the first base station (see traces 162 and 160), and for transmission it uses timeslot 6 on the second base station (see traces 162 and 161) and timeslot 8 on the first base station (see traces 162 and 160).

The mobile telephone equipment drops communications with a base station when the link quality of communication with that base station is too low. As shown here, the mobile telephone equipment drops communication with a bases station when the quality of the communication with the base station is below a particular threshold (drop_origin_RP_threshold 153). As shown, trace 150, which represents signal quality in the link between the mobile telephone equipment and the first base station, drops below the drop_origin_RP_threshold 153 around position 97. The mobile telephone equipment sends a link cancel message to the base station form which the signal quality has dropped below the threshold. As shown here in FIG. 2C, the link cancel message is sent at position 101 as control $C_1$ message from PS (trace 162) to the first base station (trace 160). The RPC sends a link cancel acknowledgement to the mobile telephone equipment, and then the mobile telephone equipment drops connection to the base station.

The threshold drop_origin_RP_threshold is chosen to be at a predetermined link quality level which corresponds to the threshold between good and poor subjective voice quality, according to an embodiment in the invention.

Alternatively, the link may have deteriorated to the point that the link cancel message or its acknowledgement are lost. In such a case, the mobile telephone equipment automatically drops the link to the first base station and the RPC automatically drops the link to the mobile telephone equipment from the first base station on its own initiative upon detecting that the link quality as seen by the first base station has dropped below the drop_origin_RP_threshold_at_RP. At this point, the mobile telephone equipment is fully connected to the other base station on every frame and the RPC no longer needs to alternate between frames between the two base stations, regardless of whether the link to the first base station is dropped in a controlled fashion or through default by signal quality exceeding a predetermined threshold.

As shown here, starting with position 121, the mobile telephone equipment is communicating only with the second base station, represented by trace 161. The RPC acknowledges that the first base station has been dropped at position 121 marked with a ⑥. At this point, the mobile telephone equipment is completely handed over to the second base station.

The effect on system quality can be throttled by how much larger a connect_destination_RP_threshold is chosen than the drop_origin_RP_threshold. If connection_destination_RP_threshold is set very high, a mobile telephone equipment will be connected to multiple base stations almost all the time. Under such condition, the system capacity is effectively cut in half compared to a system in which there is no seamless handover. In such a situation in which a mobile telephone equipment is connected to multiple base stations almost all the time, fairly reliable handover is provided even in cases where the signal from one base station dropped suddenly such as may occur when a subscriber walks or turns around a corner in an urban setting. If the connect_destination_RP_threshold is set only slightly larger than the drop_origin_RP_threshold, then the mobile telephone equipment looks for a connection to a second base station only when it can reasonably assume that handover will be needed. Such a situation would occur for example when a subscriber moves from one cell to another cell. If connect_destination_RP_threshold is set to small, the process for establishing a link to the second base station may not have enough time to complete before the signal quality from the originating base station becomes unusable. Such a situation may occur when a subscriber moves fast relative to the cell size. The best setting for connect_destination_RP_threshold is a compromise between the ability to respond to sudden changes in signal strength and reduction in system capacity.

A further reduction in mobile telephone equipment power consumption may be advantageously achieved by restricting the search for the second base station to those times when link quality from the first base station is below a threshold, say search_for_other_RP_threshold (search_for_other_RP_threshold>connect_destination_RP_threshold>drop_origin_RP_threshold). As long as the link quality on its active timeslot is above search_for_other_RP_threshold, the mobile telephone equipment turns off its receiver on idle timeslots, according to one embodiment of the invention.

Figure 3:
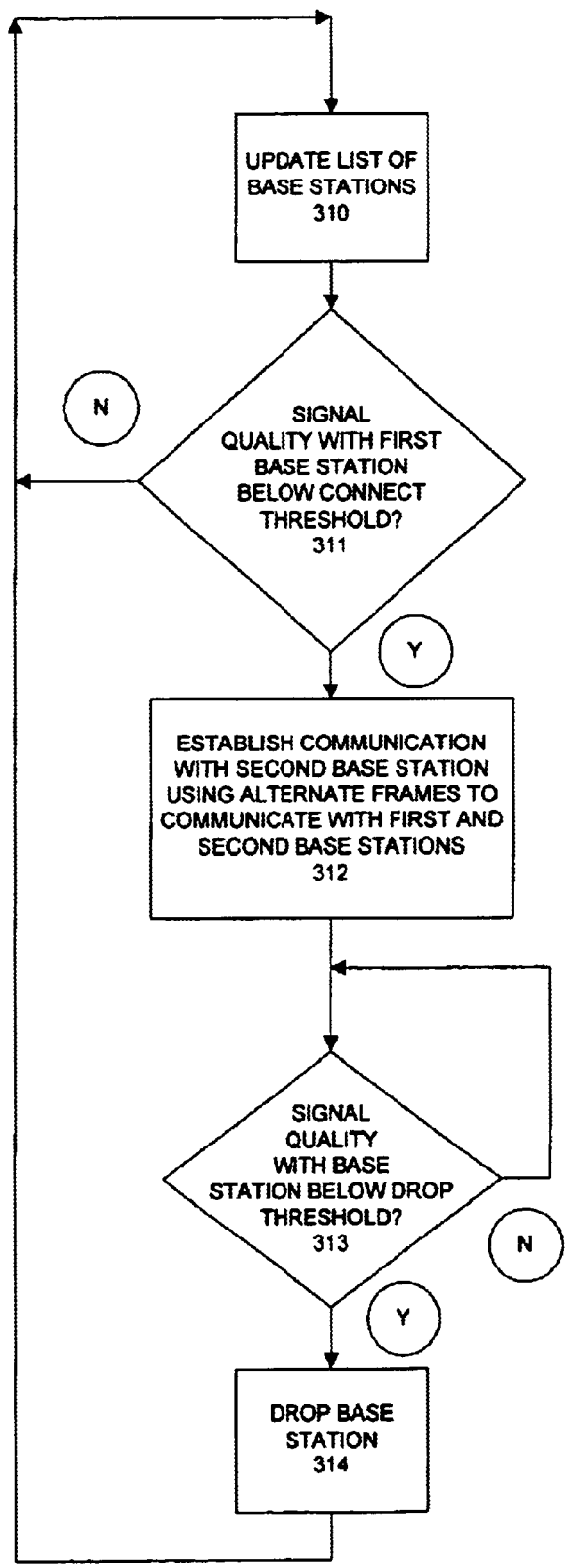
FIG. 3 is a simplified flow chart of a handover process, according to an embodiment of the invention.

FIG. 3 is a simplified flow chart of a handover process, according to an embodiment of the invention. FIG. 3 shows different approaches of various embodiments of the invention which may be used individually or in various combinations. For example, an aspect of the flow chart is the use of a threshold to determine whether the mobile telephone equipment should attempt to connect with a second base station. Yet another aspect of the flow chart is the use of a threshold to determine whether communication with the first base station should be dropped. Another aspect of the flow chart is the measurement of signal quality of other base stations (RPs ordered by signal quality). Such measurement may be used to select the next base station to which to attempt to connect.

As shown in FIG. 3, the mobile telephone equipment (PS) updates the list of base stations (RPs) ordered by signal quality (block 310). If signal quality is not below the particular threshold, then the mobile telephone equipment continues to update its list of base stations ordered by signal quality (block 310). If signal quality of communication with the current base station is below a particular threshold (block 311), then proceed toward connecting with another base station (block 312).

Communication is established with a second base station using the alternate frames to communicate with the first and second base stations (block 312). Thus, the mobile telephone equipment is in communication with two base stations.

Signal quality in the links with the respective base stations is monitored. If the signal quality with a base station is below a drop threshold (block 313), then the base station is dropped (block 314). At this point, a handoff from one base station to another may be complete. It is also possible, however, that the base station dropped was the second base station. For example, it may be that after moving into the area of the second base station, the subscriber moved back into the area of the first base station and then dropped the second base station. After dropping the second base station (block 314), the chart shows returning to updating list of base stations (block 310).

Figure 4:
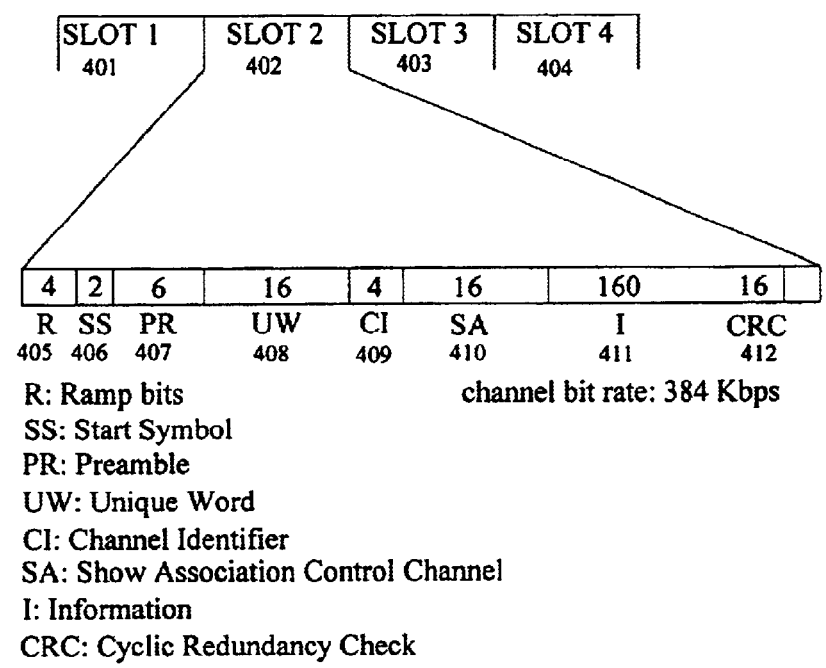
FIG. 4 shows a sample half-frame structure following the Personal Handyphone System standard (also known as ARIB RCR STD-28), showing time available in the ramp bits to switch channels between timeslots, according to an embodiment of the invention.

FIG. 4 shows a sample half-frame structure following the Personal Handyphone System standard (also known as ARIB RCR STD-28), showing the relatively short time available in the ramp bits to switch channels between timeslots, according to an embodiment of the invention. A set of timeslots as would be used in a communication with a mobile telephone are shown (slot 1 401, slot 2 402, slot 3 403, and slot 4 404). Each slot, according to the embodiment shown, is 0.625 ms in length. The channel bit rate is 384 Kbps. A typical half-frame includes ramp bits 405 (4 bits), start symbol 406 (2 bits), preamble 407 (6 bits), unique word 408 (16 bits), channel identifier 409 (4 bits), slow associated control channel 410 (16 bits), information 411 (160 bits), and cyclic redundancy check 412 (16 bits). The particular format of timeslots may be different, depending on the embodiment of the invention. For example, embodiments of the invention may apply to systems in which timeslots contain information in a digital format as well as to systems where timeslots contain information in an analog format. In the later case, some low pass filtering may be advantageously applied to smooth the transition between alternate frames, according to an embodiment of the invention.

The above description of a timeslot applies to certain embodiments of the invention. Other embodiments of the invention are directed to systems with other timeslot formats, including formats in which timeslots contain information in a digital format, as well as formats where timeslots contain information in an analog format.

Figure 5:
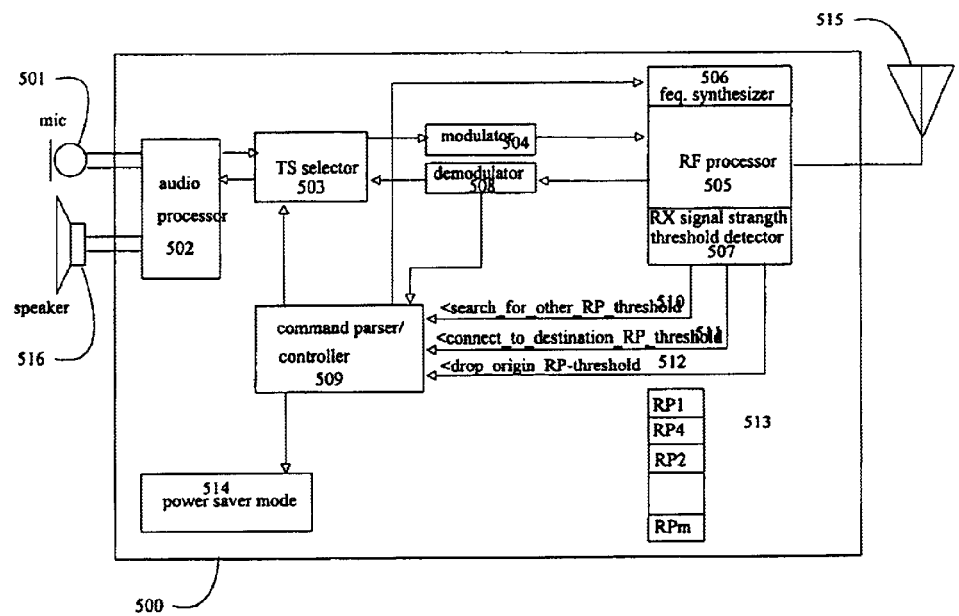
FIG. 5 is a simplified block diagram of a personal station, according to an embodiment of the invention.

FIG. 5 is a block diagram of a personal station, according to an embodiment of the invention. A personal station 500 may have one of various types of architectures. The architecture shown is architecture according to one embodiment of the invention. A user communicates with the station by a microphone 501, which is coupled to an audio processor 502. Audio processor 502 is coupled to a speaker 520. A timeslot selector 503 receives information from audio processor 502 and passes such information to modulator 504, which is coupled to RF processor 505. Timeslot selector 503 also receives control from command parser/controller 509. RF processor 505 passes signals to demodulator 508, which forwards information to command parser/controller 509 and timeslot selector 503. Timeslot selector 503 has an input to audio processor 502. Receive signal strength threshold detector 507 is coupled into command parser/controller 509. Control command parser/controller 509 programs the RX signal strength threshold detector 507 to report to parser/controller 509 when the signal exceeds the following thresholds: search_for_other_RP_threshold 510, connect_to_destination_RP_threshold 511, and drop_origin_RP_threshold 512. Command parser/controller 509 is coupled into timeslot selector 503 and power save mode 514. Frequency synthesizer 506, which receives a control from command parser/controller 509, is coupled to RF processor 505. RF processor 505 is coupled to RX signal strength threshold detector 507 and to antenna 515. Personal station 500 also includes a list of radio ports (base stations) ranked by signal quality 513.

Figure 6:
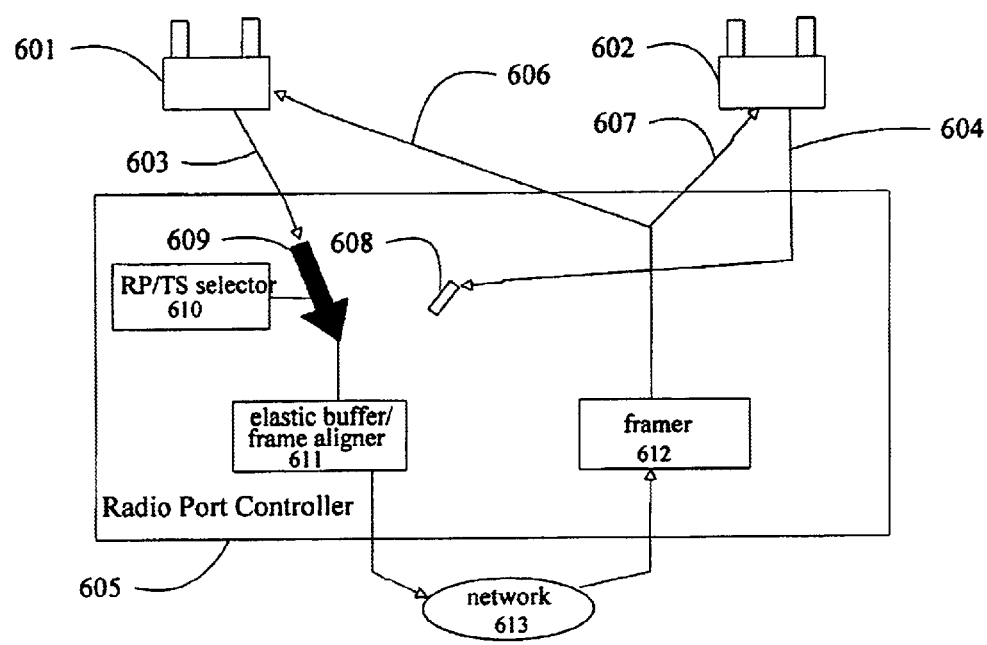
FIG. 6 is a simplified block diagram of a radio port, according to an embodiment of the invention.

FIG. 6 is a block diagram of a radio port, according to an embodiment of the invention. Shown are two radio ports (base stations), radio port 601 and radio port 602. Radio ports 601 and 602 are coupled to radio port controller 605. Radio port controller 605 is coupled to network 613. Data from network 613 passes into framer 612 from which is it distributed to radio port 601 via line 606 and radio port 602 via line 607. Thus, both radio ports may transmit both of alternate frames to the mobile subscriber. However, incoming frames from the mobile subscriber are alternately selected and passed on to network 613. As shown, frames from radio port 601 and radio port 602 arrive on lines 603 and 604 respectively into radio port controller 605. The frames are then selected between at points 609 and 608 in the radio port controller. This function is carried out by functional block RP/TS selector 610 within radio port controller. This selection is made alternately by frame. The frames are then collected by elastic buffer/frame aligner 611 which makes timing adjustments as required by the fixed timing of the wired network and then passed onto network 613.

Alternative Embodiments

The techniques and systems described above may also apply to a system in which mobile telephone equipment connects to more than two base stations. In such a configuration, according to one embodiment, every N-th frame is used for communications to the N-th base station and data streams for N base stations are interleaved.

The methods and systems described above may apply in a system in which the time frames are interleaved in a hierarchical fashion for devices connecting to different RPCs. In such a configuration, synchronization of the base stations is achieved other than by the RPCs, according to an embodiment of the invention.

Conclusion

The foregoing description of various embodiments of the invention has been presented for purposes of illustration and description. It is not intended to limit the invention to the precise forms disclosed.

What is claimed is:

1. A mobile communications system comprising:
   a plurality of base stations;
   a plurality of mobile telephones, each mobile telephone communicating with at least a base station from the plurality of base stations using frames; and
   circuitry that, when a mobile telephone has established communication with a first base station, if resources are available in a second base station, causes communication to be established with the second base station, the circuitry causing communication to occur with both the first and second base stations on a series of alternate frames before communication is dropped with the first base station.

2. The system of claim 1, the circuitry being comprised by the mobile telephone.

3. The system of claim 1, the circuitry being comprised by equipment coupled to the base stations.

4. The system of claim 1, wherein the first and second base station both transmit on every uplink frame and the mobile telephone selects alternately between transmission from the first and second base stations.

5. The system of claim 1, wherein a frame comprises an uplink and a downlink communication.

6. The system of claim 1, wherein the circuitry causes communication to be established with a third base station, the circuitry causing communication to occur with the first, second, and third base stations alternately, on different frames.

7. The system of claim 1, wherein the circuitry causes communication to be established with a plurality of base stations, in addition to the first and second base stations, the circuitry causing communication to occur with the first, second, and plurality of base stations alternately, on different frames.

8. The system of claim 1, including circuitry that passes frames from the mobile telephone to a network, the circuitry that passes alternately passing frames from the base stations, without selecting between the alternate frames based on signal quality.

9. The system of claim 1, including circuitry that passes the same frames from a telecommunications network to the first and second base stations.

10. The system of claim 1, each frame having a length of 5 milliseconds.

11. The system of claim 1, wherein the circuitry attempts to establish communication with the second base station if signal quality of communication with the first base station is below a particular level.

12. The system of claim 1, wherein the circuitry drops communication with a base station if signal quality of communication with the base station is below a particular level.

13. The system of claim 1, wherein system capacity is controlled by adjusting a combination of (a) a particular level of signal quality of communication with the first base station below which the circuitry attempts to establish communication with the second base station and (b) a particular level of signal quality of communication with a base station below which the circuitry drops communication with the base station.

14. The system of claim 13 in which the combination is adjusted automatically based on measured utilization of system resources and desired communication reliability.

15. The system of claim 1, wherein the circuitry selects the second base station from among a set of base stations based on signal quality between the base stations and the mobile telephone.

16. The system of claim 1, wherein the circuitry selects as the second base station a base station having the best signal quality between the base station and the mobile telephone, from among base stations other than the first base station.

17. The system of claim 1, the mobile telephone having a list of base stations ordered based on signal quality between the base stations and the mobile telephone, and the mobile telephone including circuitry that selects the second base station as the first available base station on the list.

18. The system of claim 17, wherein the list is ordered based on received signal strength indicator (RSSI).

19. The system of claim 17, wherein the list is ordered based on frame error rate (FER).

20. The system of claim 1, including circuitry that selects between a signal from the first base station and a signal from the second base station based on a frame error rate in the respective signals.

21. The system of claim 1, wherein the mobile telephone occasionally uses the particular timeslot for exchange of control information.

22. The system of claim 1, wherein each mobile telephone has a single radio capable of communication on various frequencies.

23. The system of claim 22, wherein the radio is not capable of communicating on different frequencies on adjacent timeslots of a frame.

24. The system of claim 1, wherein a frame comprises two half frames, and a half frame includes no more than six timeslots.

25. A mobile telephone comprising:
   a single radio;
   circuitry that monitors signal quality with various base stations; and
   circuitry that, when the mobile telephone is in communication with a first base station, wherein the frame has a plurality of timeslots for the base station to use to communicate with various of a plurality of mobile telephones in a cell covered by the base station and the frame comprises an uplink and downlink communication, causes the mobile telephone to request communication with a second base station based on the measured signal quality of the respective base stations, wherein the circuitry causes the communication to occur with both the first base station and the second base station on a series of alternate frames before communication is dropped with the first base station.

26. The mobile telephone of claim 25 including circuitry that causes the mobile telephone to make the request of communication with the second base station if signal quality of communication with the first base station is below a particular level.

27. The mobile telephone of claim 25 including circuitry that drops communication with a base station if signal quality of communication with the base station is below a particular level.

28. The mobile telephone of claim 25, including circuitry that maintains a list of base stations ordered based on the measured signal quality, and wherein the second base station is selected based on the list.

29. The mobile telephone of claim 28, wherein the list is ordered based on RSSI.

30. The mobile telephone of claim 28, wherein the list is ordered based on FER.

31. The mobile telephone of claim 25 including circuitry that receives a message from the second base station indicating that communication cannot take place with the second base station and circuitry that in response requests communication with a third base station.

32. The mobile telephone of claim 25 including circuitry that selects between a signal from the first base station and a signal from the second base station based on a frame error rate in the respective signals.

33. The mobile telephone of claim 25, wherein the circuitry causes communication to be established with a third base station, the circuitry causing communication to occur with the first, second, and third base stations alternately, on different frames.

34. The mobile telephone of claim 25, wherein the circuitry causes communication to be established with a plurality of base stations, in addition to the first base station and the second base station, the circuitry causing communication to occur with the first, second, and the plurality of base stations alternately, on different frames.

35. The mobile telephone of claim 25, wherein each frame has a length of 5 milliseconds.

36. The mobile telephone of claim 25, wherein the mobile telephone is not capable of communicating on different frequencies on adjacent slots of a frame.

37. The mobile telephone of claim 25 wherein the frame comprises two half frames, and each half frame includes no more than six timeslots.

38. A base station comprising:
a radio capable of communication with mobile telephones, the radio using frames, a frame comprising a plurality of times lots; and
circuitry that establishes communication with a mobile telephone when the mobile telephone is in communication with another base station, wherein
the circuitry sends to the mobile telephone the same frames from the network that the another base station sends to the mobile telephone
the circuitry receives alternate frames from the mobile telephone, which sends frames alternately to the base station and the another base station before communication is dropped from either the base station or the another base station.

39. The base station of claim 38, wherein a frame comprises an uplink and a downlink communication.

40. The base station of claim 38, wherein communications is established between the mobile telephone and a plurality of base stations, and the base station receives alternate frames from the mobile telephone, which sends frames alternately to the base stations among the base station and the plurality of base stations.

41. The base station of claim 38, each frame having a length of 5 milliseconds.

42. The base station of claim 38 including circuitry that broadcasts to the mobile telephone a particular level of signal quality of communication with a particular base station below which the mobile telephone attempts to establish communication with a base station other than one with which the mobile telephone is communicating.

43. The base station of claim 38 including circuitry that broadcasts to the mobile telephone a particular level of signal quality of communication with a particular base station below which the circuitry drops communication with the particular base station.

44. The base station of claim 38, wherein system capacity is controlled by adjusting a combination of (a) a particular level of signal quality of communication with a particular base station below which the mobile telephone attempts to establish communication with another base station and (b) a particular level of signal quality of communication with a particular base station below which the circuitry drops communication with the particular base station.

45. The base station of claim 44 including circuitry to automatically adjust the combination based on measured utilization of system resources and desired communication link reliability.

46. The base station of claim 38, wherein the frames occasionally include control information.

47. The base station of claim 38, wherein the mobile telephone has a single radio capable of communication on various frequencies.

48. The base station of claim 47, wherein the radio of the mobile telephone is not capable of communicating on different frequencies on adjacent times lots of a frame.

49. The base station of claim 38, wherein the frame comprises two half frames, and each half frame comprises no more than six timeslots.

50. The base station of claim 38, wherein the circuitry passes the frames to a radio port controller that constructs a stream of frames from the mobile telephone by interleaving both
a series of alternate frames received from the base station, the alternate frames having data from the mobile telephone and
a series of alternate frames received from the another base station, the alternate frames received from the another base station having data from the mobile telephone.

51. A method of seamless handover in a telecommunications system, the method including:
when a mobile telephone has established communication with a first base station, if resources are available in a second base station, establishing communication with the second base station and causing communication to occur with both the first and second base stations on a series of alternate frames before communication is dropped with the first base station.

52. The method of claim 51, including establishing the communication with the second base station only if signal quality of communication with the first base station is below a particular level.

53. The method of claim 51, including dropping communication with a base station if signal quality of communication with the base station is below a particular level.

54. The method of claim 51, including, to achieve a desired system capacity, adjusting a combination of (a) a particular level of signal quality of communication with the first base station below which the circuitry attempts to establish communication with the second base station and (b) a particular level of signal quality of communication with a base station below which the circuitry drops communication with the base station.

55. The method of claim 54 including performing the adjusting automatically based on measured utilization of system resources and desired communications link reliability.

56. The method of claim 51, including selecting the second base station from among a set of base stations based on signal quality between the base stations and the mobile telephone.

57. The method of claim 51, including selecting as the second base station a base station having the best signal quality between the base station and the mobile telephone, from among base stations other than the first base station.

58. The method of claim 51, including selecting as the second base station a base station based on RSSI.

59. The method of claim 51, including selecting as the second base station a base station based on FER.

60. The method of claim 51, including selecting between a signal from the first base station and a signal from the second base station based on a frame error rate in the respective signals.

61. The method of claim 51 including alternatively passing frames from the base stations to a network without selecting between the alternate frames based on signal quality.

62. The method of claim 51, wherein the frame comprises two half frames, and each half frame includes no more than six timeslots.

63. A mobile communications system comprising:
- a plurality of base stations;
- a plurality of mobile telephones, each mobile telephone communicating with at least a base station from the plurality of base stations using frames;
- circuitry that, when a mobile telephone has established communication with a first base station, if resources are available in a second base station, causes communication to be established with the second base station, the circuitry causing communication to occur with both the first and second base stations on a series of alternate frames before communication is dropped with the first base station, wherein a frame comprises two half frames and each half frame includes no more than six timeslots, wherein the circuitry attempts to establish communication with the second base station if signal quality of communication with the first base station is below a particular level and the circuitry drops communication with a base station if signal quality of communication with the base station is below a particular level;
- circuitry in the mobile telephone that monitors signal quality with various base stations; and circuitry in the mobile telephone that selects the second base station based on the measured signal quality of the various base stations.

64. The system of claim 63, wherein system capacity is controlled by adjusting a combination of (a) a particular level of signal quality of communication with the first base station below which the circuitry attempts to establish communication with the second base station and (b) a particular level of signal quality of communication with a base station below which the circuitry drops communication with the base station.

65. The system of claim 64 in which the combination is adjusted automatically based on measured utilization of system resources and desired communications link reliability.

66. The system of claim 63, wherein the signal quality is determined based on RSSI.

67. The system of claim 63, wherein the signal quality is determined based on FER.

68. The system of claim 63, including circuitry that alternatively passes frames from the base stations to a network without selecting between the alternate frames based on signal quality.

* * * * *